United States Patent
Bae

(10) Patent No.: US 12,282,105 B2
(45) Date of Patent: Apr. 22, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jungnam Bae, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 678 days.

(21) Appl. No.: 17/556,628

(22) Filed: Dec. 20, 2021

(65) Prior Publication Data

US 2022/0206166 A1 Jun. 30, 2022

(30) Foreign Application Priority Data

Dec. 28, 2020 (KR) .................. 10-2020-0185010

(51) Int. Cl.
*G01S 19/42* (2010.01)
*H04W 4/46* (2018.01)

(52) U.S. Cl.
CPC .............. *G01S 19/42* (2013.01); *H04W 4/46* (2018.02)

(58) Field of Classification Search
CPC ......... H04W 4/46; H04W 4/44; H04W 4/029; H04W 4/02; H04W 4/40; H04W 72/0446; H04W 4/027; H04W 40/20
See application file for complete search history.

(56) References Cited

U.S. PATENT DOCUMENTS

| | | | |
|---|---|---|---|
| 10,705,542 B1* | 7/2020 | Kimchi | G01S 5/14 |
| 11,388,565 B2* | 7/2022 | Hwang | H04W 28/02 |
| 11,529,973 B1* | 12/2022 | Dittmer | G06V 10/255 |
| 2007/0117525 A1* | 5/2007 | Osafune | G08G 1/20 340/901 |
| 2010/0088464 A1* | 4/2010 | Yang | G06F 12/0246 711/E12.001 |
| 2011/0261890 A1* | 10/2011 | Nagura | H04L 63/123 375/259 |
| 2011/0264918 A1* | 10/2011 | Nagura | H04L 9/3247 713/179 |
| 2013/0279491 A1* | 10/2013 | Rubin | G08G 1/162 370/347 |
| 2016/0121816 A1* | 5/2016 | Koo | H04L 12/4013 370/476 |
| 2016/0277196 A1* | 9/2016 | Jose | H04L 12/1845 |
| 2018/0212684 A1* | 7/2018 | Aoyama | G06F 3/04845 |
| 2019/0018408 A1* | 1/2019 | Gulati | G07C 5/0808 |
| 2019/0044728 A1* | 2/2019 | Karmoose | H04L 9/3242 |
| 2019/0064829 A1* | 2/2019 | Ozawa | G05D 1/0214 |

(Continued)

FOREIGN PATENT DOCUMENTS

KR 20090020328 A * 2/2009

*Primary Examiner* — Steven B Theriault
(74) *Attorney, Agent, or Firm* — Lempia Summerfield Katz LLC

(57) ABSTRACT

A vehicle includes a communicator and a controller electrically connected to the communicator. The controller is configured to identify a distance between a vehicle and the other vehicle communicatively connected to the vehicle, insert a pad data into at least one data frame based on the identified distance, and transmit the at least one data frame into which the pad data is inserted to the other vehicle through the communicator.

14 Claims, 12 Drawing Sheets

(56) References Cited

U.S. PATENT DOCUMENTS

| | | | | |
|---|---|---|---|---|
| 2020/0025865 A1* | 1/2020 | Gulati | ............... | G01S 13/42 |
| 2020/0072963 A1* | 3/2020 | Yu | ............... | G01S 7/006 |
| 2020/0229210 A1* | 7/2020 | Bharadwaj | ............... | H04L 5/0044 |
| 2020/0307580 A1* | 10/2020 | Kobayashi | ............... | B60W 30/09 |
| 2020/0389196 A1* | 12/2020 | Choi | ............... | H04H 20/53 |
| 2021/0021959 A1* | 1/2021 | MacNeille | ............... | H01Q 3/36 |
| 2021/0067970 A1* | 3/2021 | Huang | ............... | H04W 12/108 |
| 2021/0136699 A1* | 5/2021 | Scholand | ............... | H04W 4/40 |
| 2021/0195133 A1* | 6/2021 | Alm | ............... | H04N 25/75 |
| 2021/0209390 A1* | 7/2021 | Chae | ............... | H04N 1/00082 |
| 2021/0227365 A1* | 7/2021 | Vassilovski | ............... | H04B 17/345 |
| 2021/0263165 A1* | 8/2021 | Zheng | ............... | G01S 19/04 |
| 2021/0266385 A1* | 8/2021 | Lu | ............... | H04L 69/04 |
| 2021/0367735 A1* | 11/2021 | Matsuda | ............... | H04L 5/04 |
| 2022/0026566 A1* | 1/2022 | Guo | ............... | H04W 4/46 |
| 2022/0029872 A1* | 1/2022 | Cao | ............... | H04W 28/06 |
| 2022/0176975 A1* | 6/2022 | Nakamura | ............... | H04W 40/38 |
| 2022/0232621 A1* | 7/2022 | Jang | ............... | H04W 74/006 |
| 2022/0345856 A1* | 10/2022 | Frye | ............... | H04W 4/40 |
| 2022/0360361 A1* | 11/2022 | Saggar | ............... | H04W 72/12 |
| 2023/0036695 A1* | 2/2023 | Hwang | ............... | H04W 4/12 |
| 2023/0059897 A1* | 2/2023 | Miucic | ............... | H04W 4/44 |
| 2023/0076599 A1* | 3/2023 | Hung | ............... | G06F 9/3887 |
| 2023/0095560 A1* | 3/2023 | Stefanatos | ............... | H04W 74/0808 |
| | | | | 370/329 |
| 2023/0164511 A1* | 5/2023 | Vassilovski | ............... | H04W 4/029 |
| | | | | 455/456.1 |
| 2023/0184883 A1* | 6/2023 | Li | ............... | G01S 7/003 |
| | | | | 342/59 |
| 2023/0361948 A1* | 11/2023 | Dutta | ............... | H04L 5/0094 |
| 2024/0155672 A1* | 5/2024 | Ryu | ............... | H04W 76/14 |

\* cited by examiner

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2020-0185010, filed on Dec. 28, 2020 in the Korean Intellectual Property Office, the disclosure of which is incorporated herein by reference in its entirety.

TECHNICAL FIELD

The present disclosure relates to a vehicle and a control method thereof.

BACKGROUND

A Vehicle-to-everything (V2X) communication is a technology whereby a vehicle communicates with other vehicles and objects via a wired network and/or a wireless network. The V2X communication is a key technology for realizing autonomous driving of vehicles and may use 5.9 Ghz frequency band.

The V2X communication includes a vehicle-to-vehicle (V2V) communication, which aims to secure communication performance at a distance 300 m between vehicles according to a draft law of National Highway Traffic Safety Administration (NHTSA).

A conventional V2V communication secures communication performance at a distance 300 m between vehicles, which is a target range, but communication performance at a distance about 100 m between vehicles has been deteriorated.

For example, when a distance between vehicles (also referred to as a distance difference) is about 100 m, a packet error rate (PER) rapidly increases. Such a rapid increase in the PER occurs when the received signal of a vehicle is canceled by the signal reflected from a road surface depending on frequency characteristics of signals, when the distance between vehicles is about 100 m.

In the case of expressways, it is recommended that a safe distance between vehicles be about 100 m. Accordingly, when driving on expressways, a vehicle has been difficult to have a stable communication performance with other vehicles for safety and autonomous driving.

Meanwhile, conventionally, for one-to-one (or multi-party) communication between communication devices, communication devices sequentially sort data frames having a fixed structure. In this case, other data signals exist at a start position of a synchronization area and thus cause an interference of other signals.

In order to control an interference of such other data signals, a technique for creating a blank or empty frame between data frames has been conventionally developed.

For example, conventional communication devices create empty data frames corresponding to a synchronization area and control an interference of data signals using the empty or blank frame or frames between the data frames.

As another example, conventional communication devices have controlled an interference of data signals by variably controlling the sizes of blank or empty frames between data frames. When other data signals are present at a start position of a synchronization area, communication devices sort data frames so that a data frame corresponding to a synchronization area starts after other data signals.

Communication devices allow a variable gap to exist between two data frames having a fixed structure. When no other data signals exist at a start position of a synchronization area, a data frame corresponding to the synchronization area is sorted sequentially with a previous data frame.

Such a conventional technique may control a communication scheduling of data signals through blanks between data frames, but noise generated by other data signals may not be controlled. In other words, a conventional technique is not considered in a situation in which noise is generated due to multi-path. Furthermore, a conventional technique has a disadvantage in that a size of a data frame is always fixed and a synchronization area always exists for timing control.

SUMMARY

Therefore, aspect of the present disclosure are to provide a vehicle and a control method thereof capable of improving communication performance degradation occurring in a short-distance communication of the vehicle-to-vehicle (V2V) communication system.

For example, a vehicle and a control method thereof may provide a technique for removing a short-distance interference noise by applying pad data based on a global navigation satellite system (GNSS) (or referred to as a global positioning system (GPS)) to a data frame.

Additional aspects of the present disclosure may provide a vehicle and a control method thereof capable of controlling data interference generated when a data signal is received in a multi-path environment.

Furthermore, the vehicle and control method thereof may provide a technology for removing data interference by applying pad data, in response to noise, to a portion of a data frame. For example, the vehicle and the control method thereof may insert pad data only into a noise generating region among areas of a data frame. Accordingly, it is possible to block a noise signal and it is further possible to efficiently utilize a data frame compared to the prior art in which a synchronization area exists for every data frame.

In accordance with an aspect of the present disclosure, a vehicle includes a communicator and a controller electrically connected to the communicator. The controller is configured to identify a distance between a vehicle and the other vehicle communicatively connected to the vehicle, insert a pad data into at least one data frame based on the identified distance, and transmit the at least one data frame into which the pad data is inserted to the other vehicle through the communicator.

The controller may be configured to identify a length of the pad data corresponding to the identified distance among predetermined lengths of the pad data corresponding to respective distances between two vehicles. The controller may be also configured to insert the pad data having the identified length into the at least one data frame.

The controller may be configured to insert the pad data having a predetermined length into the at least one data frame.

The controller may be configured to insert the pad data to be positioned after a data field of the at least one data frame.

The pad data may include a predetermined data for removing a noise component.

The controller may be configured to receive a GNSS signal through the communicator, identify first location information related to the vehicle based on the GNSS signal, receive second location information related to the other vehicle from the other vehicle through the communicator, and identify the distance between the vehicle and the other vehicle based on the first location information and the second location information.

The controller may be configured to insert the pad data into the at least one data frame based on whether the identified distance falls within a predetermined distance range.

In accordance with another aspect of the present disclosure, a method of controlling a vehicle includes: identifying, by a controller, a distance between a vehicle and the other vehicle communicatively connected to the vehicle; inserting, by the controller, a pad data into at least one data frame based on the identified distance; and transmitting, by the controller, the at least one data frame in which the pad data is inserted to the other vehicle.

The inserting the pad data may include identifying, by the controller, a length of the pad data corresponding to the identified distance among predetermined lengths of the pad data corresponding to respective distances between two vehicles, and may include inserting, by the controller, the pad data having the identified length into the at least one data frame.

The inserting the pad data may include inserting, by the controller, the pad data having a predetermined length into the at least one data frame.

The inserting the pad data may include inserting, by the controller, the pad data to be positioned after a data field of the at least one data frame.

The pad data may include a predetermined data for removing a noise component.

The method may further include: receiving, by the controller, a GNSS signal; identifying, by the controller, first location information related to the vehicle based on the GNSS signal; and receiving, by the controller, second location information related to the other vehicle from the other vehicle. The distance between the vehicle and the other vehicle, by a controller, is identified based on the first location information and the second location information.

The inserting the pad data may include performing, by the controller, based on the identified distance within a predetermined distance range.

BRIEF DESCRIPTION OF THE DRAWINGS

These and/or other aspects of the present disclosure should become apparent and more readily appreciated from the following description of the embodiments, taken in conjunction with the accompanying drawings, of which.

DETAILED DESCRIPTION

Figure 1:
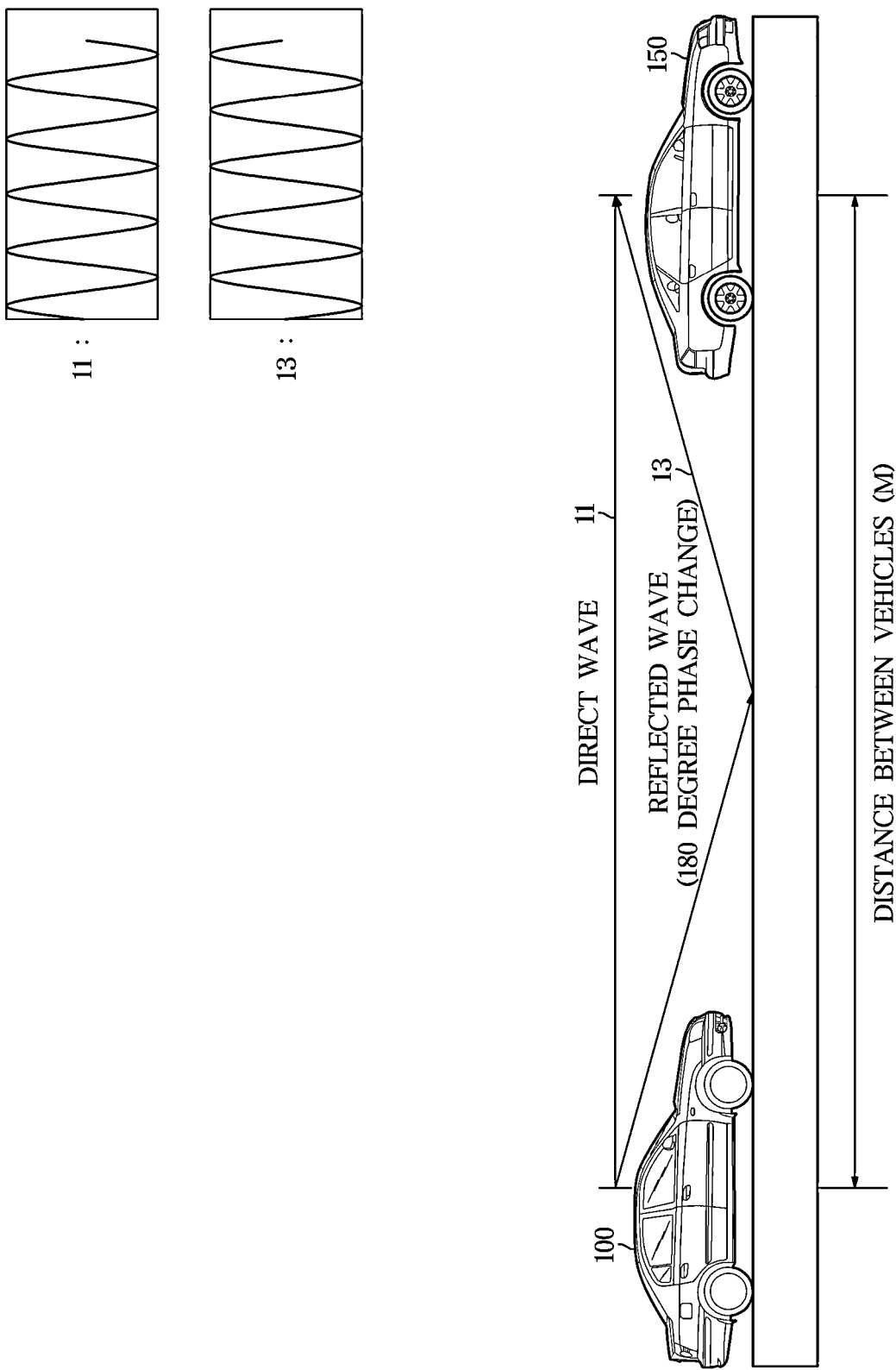
FIG. 1 is an illustrative view showing a conventional communication between two vehicles.

Reference is now made in detail to the embodiments of the present disclosure, examples of which are illustrated in the accompanying drawings. Like reference numerals refer to like elements throughout the present disclosure. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components. When a 'part', 'module', 'member', 'block', or the like of the present disclosure is described as having a purpose or performing an operation, function, or the like, the 'part', 'module', 'member', 'block' should be considered herein as being "configured to" meet that purpose or to perform that operation or function.

Throughout the specification, when an element is referred to as being "connected to" another element, it may be directly or indirectly connected to the other element and the "indirectly connected to" includes a connection to the other element via a wireless communication network.

Also, it should be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure are described in detail with reference to the accompanying drawings.

Figure 2:
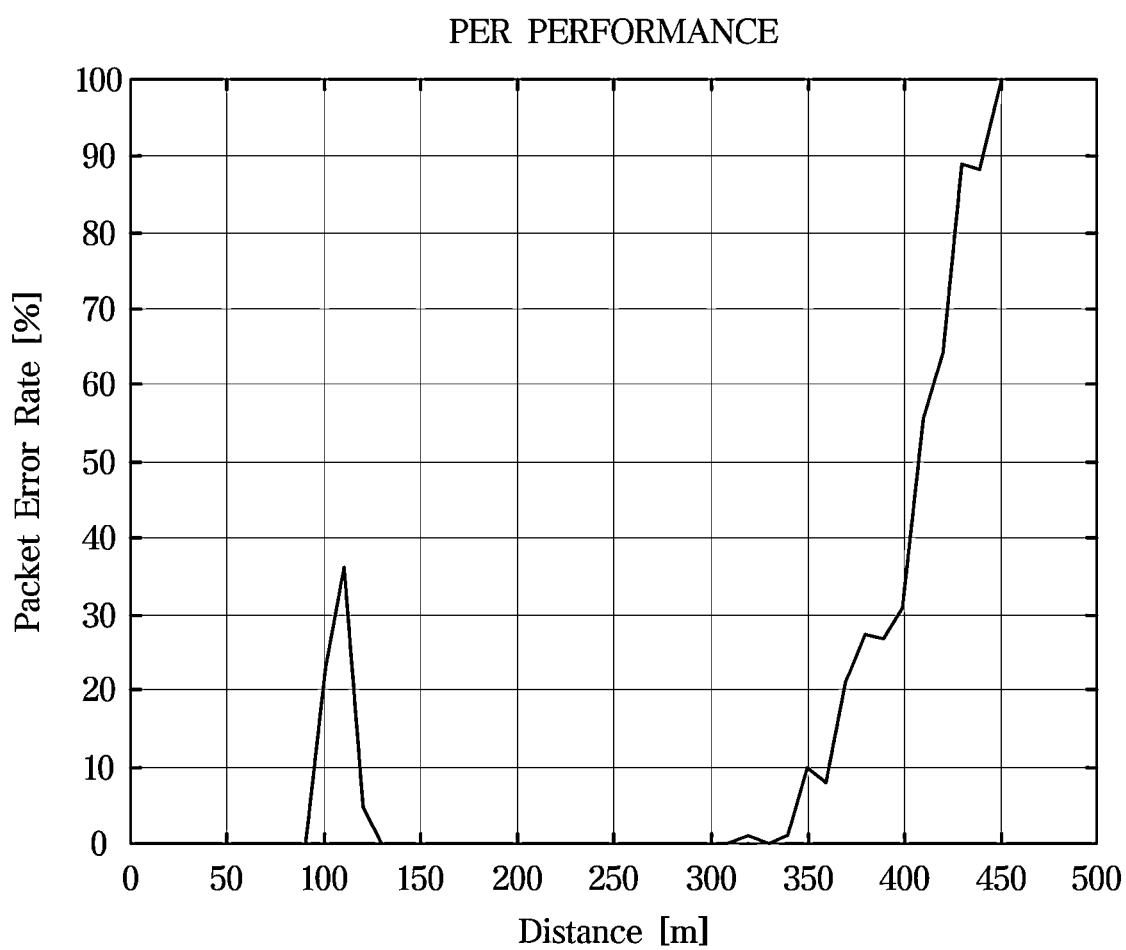
FIG. 2 is a graph showing a result of calculating packet error rate (PER) for each distance between two vehicles through an experiment in which two vehicles communicate with each other through a single antenna on a straight road according to the embodiment.

FIG. 1 is an illustrative view showing a conventional communication between two vehicles. FIG. 2 is a graph showing a result of calculating a packet error rate (PER) for each distance between two vehicles in communication between vehicles through an experiment in which two vehicles communicate with each other through a single antenna on a straight road.

Referring to FIG. 1, when a first vehicle 100 transmits a data signal, a second vehicle 150 may receive and demodulate a multi-path signal including a direct wave 11 of the data signal and a reflected wave 13 (or referred as an reversed phase signal) in which the data signal is reflected from a road surface.

For example, in the case of the first vehicle 100 and the second vehicle 150 are located in a short-distance such as 100 m from each other, when the first vehicle 100 transmits a data signal to the second vehicle 150, the second vehicle 150 may receive not only the direct wave 11 of an in-phase but also the reflected wave 13 of an reversed phase generated due to road surface reflection.

Accordingly, as the direct wave and the reflected wave are added, a quality of the signal finally received by the second vehicle 150 is reduced, as shown in FIG. 2, a PER has been increased.

Referring to FIG. 2, it may be seen that a maximum linear distance for communication between the first vehicle 100 and the second vehicle 150 is about 350 m, and the PER rapidly increases where a separation distance between the first vehicle 100 and the second vehicle 150 is about 100 m.

To prevent a rapid increase in conventional PER, an embodiment of the present disclosure may provide a technique for corresponding to multi-path noise generated due to a short-range road surface reflection by providing data including a dynamic pad data for responding to channel noise.

Hereinafter, the embodiment of the present disclosure is described in detail with reference to FIGS. 3-10.

Figure 3:
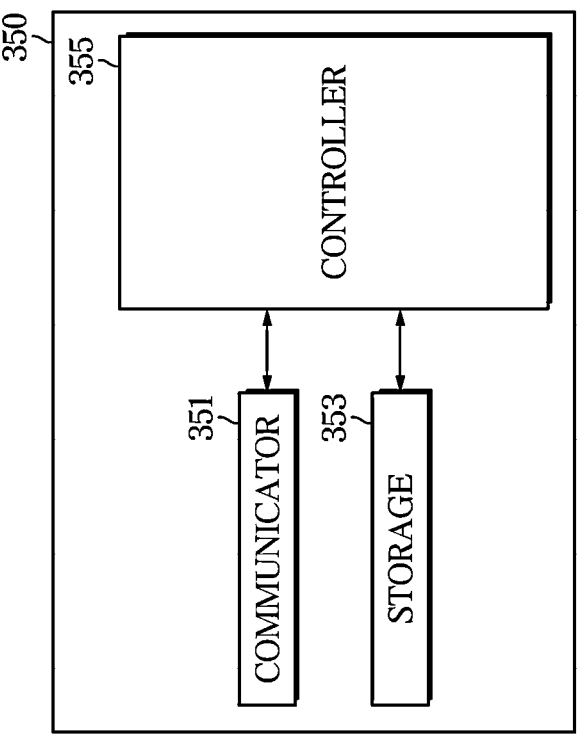
FIG. 3 is a diagram showing vehicle-to-vehicle (V2V) communication system according to the embodiment.
Figure 3:
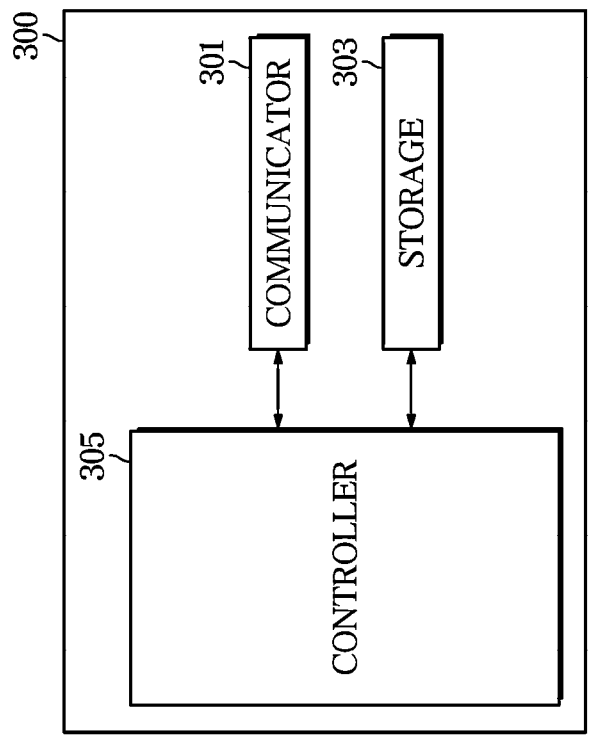

FIG. 3 is a diagram showing a vehicle-to-vehicle (V2V) communication system 3 according to the embodiment.

The V2V communication system 3 may include a first vehicle 300 (also referred to as a vehicle) and a second vehicle 350 (also referred to as the other vehicle).

The first vehicle 300 may include a communicator 301, a storage 303, and a controller 305.

The communicator 301 (also referred to as a communication circuit) may support an establishment of a wired communication channel between the first vehicle 300 and an external device, for example, the second vehicle 350. The communicator 351 may also perform communication through the established communication channel. For example, the communicator 301 may include a wireless communication module (for example, a cellular communication module, a wireless fidelity (Wi-Fi) communication module, a short-range wireless communication module, or a global navigation satellite system (GNSS) communication module to communicate with the external devices. The communicator 301 may include a communication circuit and may include a control circuit (also referred to as a control device) for controlling the communication circuit.

The communicator 301 may include a controller area network (CAN) communication circuit (also referred to as a CAN transceiver) that receives signals from the first vehicle 300 and transmits the signals to devices via a vehicle communication network. The communicator 301 may also include a control circuit (also referred to as a control device) for controlling an operation of the CAN communication circuit.

The storage 303 may store a variety of data, such as input data or output data for a software program and commands related thereto, used by at least one component (communicator 301 and/or controller 305) of the first vehicle 300. The storage 303 may include a memory, for example, a volatile memory and/or a non-volatile memory.

A predetermined distance range with respect to a distance between the first vehicle 300 and the second vehicle 350 may be stored in the storage 303. The distance range may be a criterion for determining whether to insert (or referred to as allocate) a pad data to data to be transmitted by the first vehicle 300.

The storage 303 may store a length (also referred to as a size) of a corresponding pad data for each distance (or distance range) within the distance range. Alternatively, the storage 303 may store a pad data of a corresponding length for each distance (or distance range) within the distance range.

The controller 305 (also referred to as an integrated central control unit (ICU), a control circuit, or a processor) may control at least one of other components (for example, hardware components (the communicator 301 and/or the storage 303) or software components (software programs)) of the first vehicle 300. The controller 305 may also perform processing and operations on a variety of data.

The controller 305 may identify a distance between the first vehicle 300 and the second vehicle 350.

The controller 305 may identify a separation distance from the second vehicle 350 based on a GNSS signal.

For example, the controller 305 may receive the GNSS signal through the communicator 301. The controller 305 may identify first location information related to the first vehicle 300 based on the GNSS signal. The controller 305 may receive second location information related to the second vehicle 350 through the communicator 301. The controller 305 may identify the distance between the first vehicle 300 and the second vehicle 350 based on the first location information related to the first vehicle 300 and the second location information related to the second vehicle 350.

The controller 305 may control communication with the second vehicle 350 through the communicator 301 based on the distance between the first vehicle 300 and the second vehicle 350.

When the distance between the first vehicle 300 and the second vehicle 350 falls within the predetermined distance range, the controller 305 may operate to solve a conventional problem that the second vehicle 350 receiving a data signal transmitted from the first vehicle 300 receives a data signal including the reflected wave of the reversed phase generated due to a road surface reflection.

The controller 305 may identify a signal section in which the reflected wave of the reversed phase due to the road surface reflection is generated in a data signal to be transmitted based on the distance between the first vehicle 300 and the second vehicle 350.

The controller 305 may insert a pad data into the signal section in which the reflected wave of the reversed phase is generated in the data signal to be transmitted based on the distance between the first vehicle 300 and the second vehicle 350.

For example, the controller 305 may control to insert the pad data into a data frame when the distance between the first vehicle 300 and the second vehicle 350 communicatively connected to the first vehicle 300 falls within the predetermined distance range. Also, the controller 305 may control the data frame to return to a data frame having a conventional predetermined basic structure when the distance between the first vehicle 300 and the second vehicle 350 communicatively connected to the first vehicle 300 exceeds the predetermined distance range.

The predetermined distance range may be a distance corresponding to a canceling section of a signal due to the road surface reflection. For example, the predetermined distance range may be 80 m to 120 m.

The pad data may include a predetermined data for removing a noise component. For example, the predetermined data for removing the noise component may include one of a variety of data capable of attenuating, removing, or blocking the reflected wave of the reversed phase. For example, the pad data may include dummy data.

The data frame having a predetermined structure may be one of various conventional data frames.

The controller 305 may transmit the data frame into which the pad data is inserted, i.e., data to the second vehicle 350 through the communicator 301.

The second vehicle 350 may include a communicator 351, a storage 353, and a controller 355.

The communicator 351 (also referred to as a communication circuit) may support an establishment of a wired communication channel between the second vehicle 350 and an external device, for example, the first vehicle 350. The communicator 351 may also perform communication through the established communication channel. For example, the communicator 351 may include a wireless communication module (for example, a cellular communication module, a Wi-Fi communication module, a short-range wireless communication module, or a GNSS communication module) to communicate with the external devices. The communicator 351 may include a communication circuit and may include a control circuit (also referred to as a control device) for controlling the communication circuit.

The communicator 351 may include a CAN communication circuit (also referred to as a CAN transceiver) that receives signals from the second vehicle 350 and transmits the signals to devices via a vehicle communication network. The communicator 351 may include a control circuit (also referred to as a control device) for controlling an operation of the CAN communication circuit.

The storage 353 may store data from a variety of sources, such as input data or output data for a software program and commands related thereto, used by at least one component (communicator 351 and/or controller 355) of the second vehicle 350. The storage 353 may include a memory, for example, a volatile memory and/or a non-volatile memory.

A predetermined distance range with respect to a distance between the second vehicle 350 and the first vehicle 300 may be stored in the storage 353. The distance range may be a criterion for determining whether to insert (or referred to as allocate) a pad data to data to be transmitted by the second vehicle 350.

The storage 353 may store a length (also referred to as a size) of a corresponding pad data for each distance (or distance range) within the distance range. Alternatively, the storage 353 may store a pad data of a corresponding length for each distance (or distance range) within the distance range.

The controller 355 (also referred to as an ICU, a control circuit, or a processor) may control at least one of other components (for example, hardware components (communicator 351 and/or storage 353) or software components (software programs)) of the second vehicle 350. The controller 355 may also perform processing and operations on a variety of data.

The controller 355 may identify a distance between the second vehicle 350 and the first vehicle 300.

The controller 355 may identify a separation distance from the first vehicle 300 based on the GNSS signal.

For example, the controller 355 may receive the GNSS signal through the communicator 351. The controller 355 may identify the second location information related to the second vehicle 350 based on the GNSS signal. The controller 355 may receive the first location information related to the first vehicle 300 through the communicator 351. The controller 355 may identify the distance between the first vehicle 300 and the second vehicle 350 based on the first location information related to the first vehicle 300 and the second location information related to the second vehicle 350.

The controller 355 may control communication with the first vehicle 300 through the communicator 351 based on the distance between the first vehicle 300 and the second vehicle 350.

When the distance between the first vehicle 300 and the second vehicle 350 falls within the predetermined distance range, the controller 355 may operate to solve a conventional problem that the first vehicle 300 receiving a data signal transmitted from the second vehicle 350 receives a data signal including the reflected wave of the reversed phase generated due to the road surface reflection.

The controller 355 may insert the pad data into a signal section in which the reflected wave of the reversed phase is generated in a data signal to be transmitted based on the distance between the first vehicle 300 and the second vehicle 350.

For example, the controller 355 may control to insert the pad data into the data frame when the distance between the second vehicle 350 and the first vehicle 300 communicatively connected to the second vehicle 350 falls within the predetermined distance range. Also, the controller 355 may control the data frame to return to a data frame having a conventional predetermined basic structure when the distance between the first vehicle 300 and the second vehicle 350 communicatively connected to the first vehicle 300 exceeds the predetermined distance range.

The predetermined distance range may be a distance corresponding to a canceling section of a signal due to the road surface reflection. For example, the predetermined distance range may be 80 m to 120 m.

The pad data may include a predetermined data for removing a noise component. For example, the predetermined data for removing the noise component may include one of a variety of data capable of attenuating, removing, or blocking the reflected wave of the reversed phase. For example, the pad data may include dummy data.

The data frame having a predetermined structure may be one of various conventional data frames.

The controller 355 may transmit the data frame into which the pad data is inserted, i.e., data to the first vehicle 300 through the communicator 351.

On the other hand, in the above-described embodiments, the controller 305 and the controller 355 are described as identifying the separation distance between the first vehicle 300 and the second vehicle 350 based on the GNSS signal. However, according to another embodiment, the controller 305 and the controller 355 may identify the separation distance between the first vehicle 300 and the second vehicle 350 based on the GNSS signal, a radar (not shown) of the first vehicle 300 and/or the second vehicle 350, or an output signal from a light detection and ranging (lidar) (not shown) and/or a camera (not shown).

Figure 4:
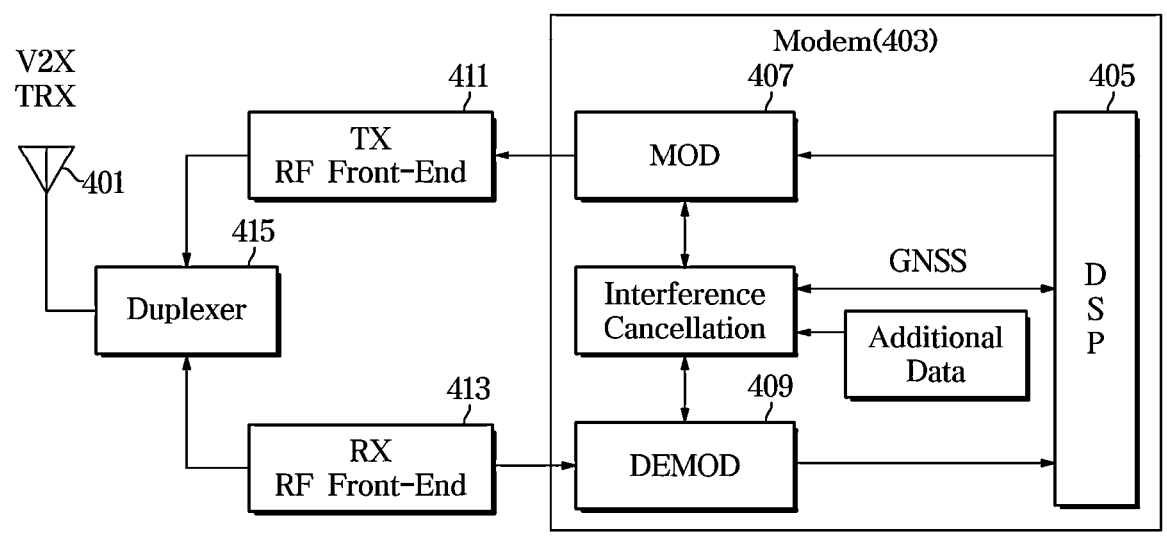
FIG. 4 is a block diagram showing a structure of a communicator for a vehicle according to the embodiment.

FIG. 4 is a block diagram showing a structure of a communicator 4 (for example, the communicator 301 and/or the communicator 351) of the vehicle (for example, the first vehicle 300 and/or the second vehicle 350) according to the embodiment.

Referring to FIG. 4, the communicator 4 may include an antenna 401 and a modem 403.

The modem 403 may include a digital signal processor (DSP) 405, a modulator (MOD) 407, and/or a demodulator (DEMOD) 409.

The modem 403 may be electrically connected to a duplexer 415 through a transmit terminal (also referred to as TX RF Front-End) 411 and a receive terminal (also referred to as RX RF Front-End) 413 of the modem 403.

The antenna 401 may be electrically connected to the modem 403 through the duplexer 415.

The modem 403 may insert the pad data (also referred to as an additional data) into the data frame of the data signal to be transmitted by a target vehicle (not shown), receiving the data signal to be transmitted by the communicator 4, so as to cancel the interference according to the reflected wave to be received together with the data signal. The modem 403 may control the data frame including the pad data, i.e., the data signal to be transmitted to a target vehicle through the antenna 401.

For example, the modem 403 may identify the separation distance from the target vehicle to which the data signal is to be transmitted based on the GNSS signal or the like. The modem 403 may insert the pad data into the data signal to be transmitted, i.e., the data frame when the separation distance from the target vehicle is within the predetermined distance range (for example, 80 m to 120 m).

For example, a length of the pad data to be inserted into the data frame may be predetermined for each distance (or distance range) within the predetermined distance range.

When the modem 403 receives the data signal from the target vehicle, the modem 403 may restore data to enable smooth communication with the target vehicle located in a short-distance.

Meanwhile, in the above-described embodiment of FIG. 4, the modem 403 is described as including in the communicator 4, but according to another embodiment, the modem 403 may be included in a controller (for example, the controller 305 and/or the controller 355) of the vehicle (for example, the first vehicle 300 and/or the second vehicle 350).

Figure 5A:
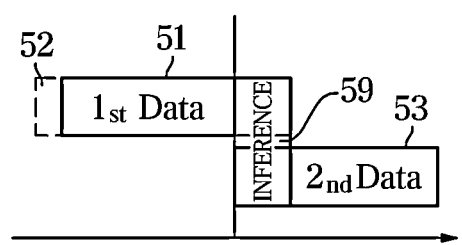
FIG. 5A and FIG. 5B are diagrams respectively showing data signals received by the vehicles according to the related art and showing data signals received by the vehicles according to the embodiment of the present disclosure.
Figure 5B:
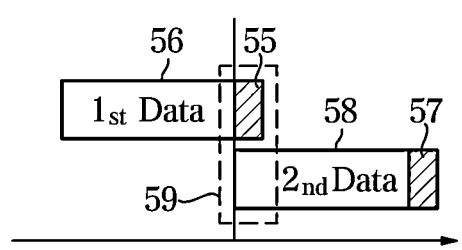

FIG. 5A and FIG. 5B are diagrams respectively showing data signals received by the vehicles according to the related art and showing data signals received by the vehicles according to the embodiment of the present disclosure.

Conventionally, in the case of the distance between two vehicles, for example, the first vehicle 300 and the second vehicle 350, is within the predetermined distance range, when the first vehicle 300 continuously transmits a first data 51 (also referred to as a first data frame) and a second data 53 (also referred to as a second data frame), the second vehicle 350 may receive the data from the first vehicle 300 as shown in FIG. 5A.

Referring to FIG. 5A, the second vehicle 350 does not receive the first data 51 transmitted by the first vehicle 300 as it is. However, the second vehicle 350 may receive a data 52 including noise due to multi-path (also referred to as reflected wave of a short-distance road surface). Accordingly, when the second vehicle 300 receives the second data 53 transmitted by the first vehicle 300 after the first data 51, the first data 52 and the second data 53 are overlapped, resulting in generating interference 59.

A data section in which a degradation of performance occurs due to noise caused by multi-path may correspond to the distance between the first vehicle 300 and the second vehicle 350.

Therefore, according to the embodiment of the present disclosure, when the distance between two vehicles, for example, the first vehicle 300 and the second vehicle 350, is within the predetermined distance range, the first vehicle 300 may transmit data corresponding to (also referred to as attenuating, removing, or blocking) the reflected wave of the short-distance road surface.

For example, the first vehicle 300 may insert the data pad of a predetermined length according to the separation distance from the second vehicle 350 into the data frame to generate data corresponding to the reflected wave of the short-distance road surface.

Referring to FIG. 5B, the second vehicle 350 may receive a first data 56 including the first pad data 55 and a second data 58 including the second pad data 57, which may correspond to the reflected wave of the short-distance road surface transmitted by the first vehicle 300.

For example, when the distance between the first vehicle 300 and the second vehicle 350 is within the predetermined distance range, the first vehicle 300 may insert the pad data into each data to transmit the first data 56 including the first pad data 55 and the second data 58 including the second pad data 57 to the second vehicle 350.

A length of data may be predetermined for each distance (and/or distance range) between the first vehicle 300 and the second vehicle 350.

For example, the length of the first pad data 55 in the first data 56 may correspond to a part that is interfered with (affected) by the noise caused by multi-path when the second vehicle 350 receives the first data 56 transmitted from the first vehicle 300. Furthermore, the length of the second pad data 57 in the second data 58 may correspond to a part that is interfered with (affected) by the noise caused by multi-path when the second vehicle 350 receives the second data 58 transmitted from the first vehicle 300.

When the second vehicle 350 continuously receives the first data 56 and the second data 58, a partial section of the received second data 58 overlaps a section of the first pad data 55 of the first data 56. Accordingly, the interference caused by multi-path due to the conventional road surface reflection in the second vehicle 350 may be resolved.

In addition, referring to FIG. 5B, according to an embodiment of the present disclosure, the data pad is not applied to a section of the data frame in which noise is not generated. Accordingly, the embodiment of the present disclosure may remove the noise while efficiently using data.

Figure 6A:
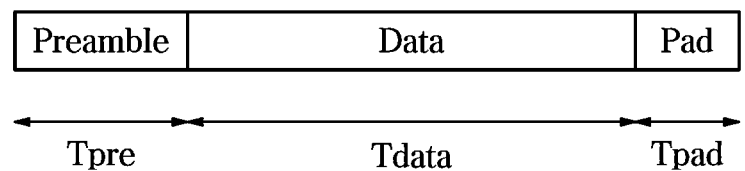
FIG. 6A and FIG. 6B are diagrams respectively showing a frame structure of data including a dynamic pad data and showing a frame structure of data including a fixed pad data according to the embodiment.
Figure 6B:
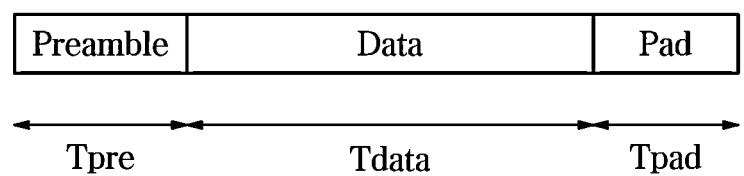
Figure 7:
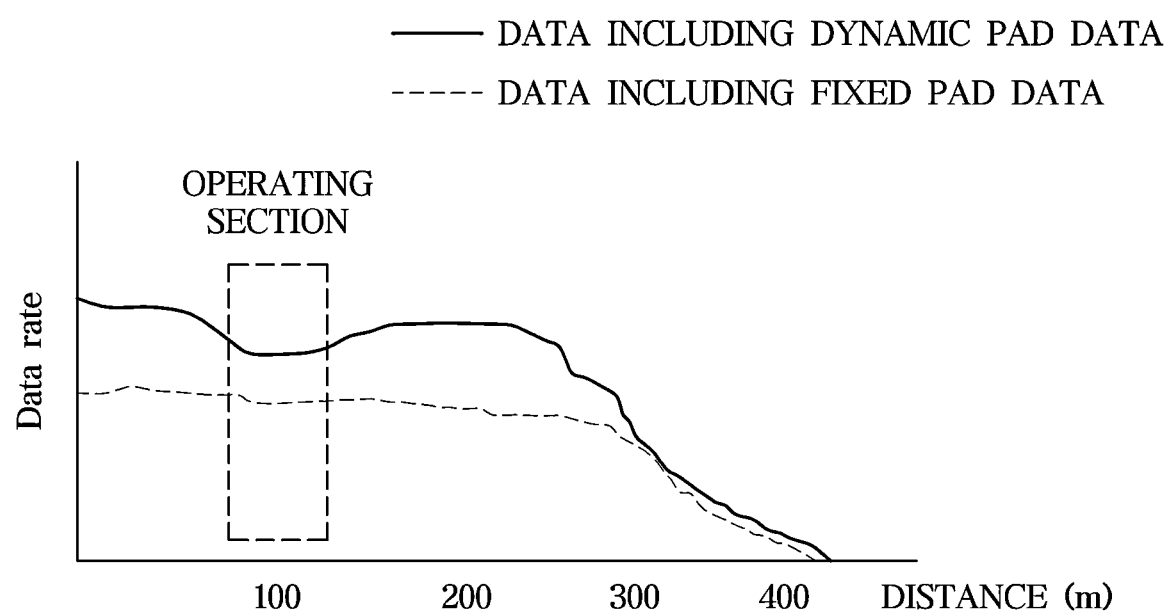
FIG. 7 is a graph showing throughput rates of data to which a dynamic pad data is allocated and data to which a fixed pad data is allocated for each distance between vehicles according to the embodiment.

FIG. 6A and FIG. 6B are diagrams respectively showing a frame structure of data including a dynamic pad data and showing a frame structure of data including a fixed pad data according to the embodiment. FIG. 7 is a graph showing throughput rates of data to which a dynamic pad data is allocated and data to which a fixed pad data is allocated for each distance between vehicles according to the embodiment.

Referring to FIG. 6A, a pad data may include a dynamic pad data.

A frame structure of data including the dynamic pad data may be a structure in which preamble, data, and pad data are sequentially sorted.

A total length of the data frame $T_{tot}$ (also referred to as total size) is determined by summing a length of the preamble $T_{pre}$, a length of the date $T_{data}$, and a length of the pad data $T_{pad}$. The length of pad data may vary from 0 to an arbitrary value according to the distance between the two vehicles, and thus the total length of the data frame may also vary.

There is a trade-off relationship between the size of the pad data and the data throughput of the vehicle. Accordingly, in the vehicle transmitting data, the dynamic pad data may be allocated only a section of the data frame in which a degradation of performance occurs due to the short-distance road surface reflection, so that the vehicles may efficiently manage noise control and data throughput in data communication between each other.

When the first vehicle 300 identifies that the separation distance from the second vehicle 350 is 80 m to 120 m during communication with the second vehicle 350, the first vehicle 300 may allocate the pad data to the data, i.e., insert the pad data into the data frame. Accordingly, the second vehicle 350 receiving the data to which the pad data is allocated may easily remove noise due to the road surface reflection based on the pad data inserted into the data.

When the separation distance between the first vehicle 300 and the second vehicle 350 is narrower than 80 m or wider than 120 m, the first vehicle 300 may effectively utilize the data frame by not allocating the pad data to the data or by removing the pad data in the case of the data to which the pad data is already allocated.

Referring to FIG. 6B, the pad data may include a fixed pad data.

A frame structure of data including the fixed pad data may be a structure in which preamble, data, and pad data are sequentially sorted.

A total size of the data frame $T_{tot}$ is determined by summing a size of the preamble $T_{pre}$, a size of the date $T_{data}$, and a size of the pad data $T_{pad}$. In the case of the size of the pad data is fixed, the total size of the data frame may also be fixed.

The standard of communication performance between two vehicles recommended by the National Highway Traffic Safety Administration (NHTSA) is to enable smooth communication at a distance of 300 m between two vehicles. Accordingly, in an embodiment of the present disclosure, the fixed pad data may be allocated to the data in order to respond to noise generated when the distance between the two vehicles is 300 m. In other words, the fixed pad data may be inserted into the data frame.

As such, in the embodiment of the present disclosure, when the separation distance between the two vehicles is 300 m, while the two vehicles have the advantage of being able to perform stable communication with each other, actual effective data frame may decrease, which may result in a decrease in data throughput.

Referring to FIG. 7, it may be seen that a throughput rate of the data including the fixed pad data is lower than that of the data including the dynamic pad data.

Figure 8:
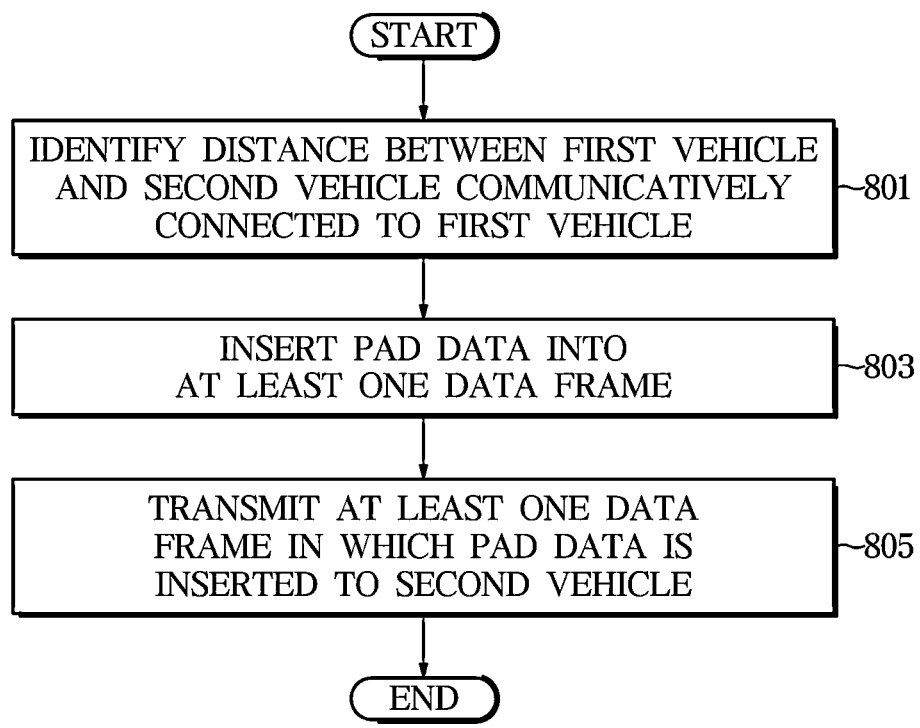
FIG. 8 is a flowchart showing an operation of a first vehicle according to the embodiment.

FIG. 8 is a flowchart showing an operation of the first vehicle 300 (and/or the controller 305 of the first vehicle (300)) according to the embodiment.

The first vehicle 300 (or also referred to as an ego vehicle) may identify the distance between the first vehicle 300 and a second vehicle 350 (also referred to as a target vehicle) communicatively connected to the first vehicle 300 (801).

The first vehicle 300 may receive the GNSS signal through the communicator 301 thereof and identify first location information related to the first vehicle 300 based on the GNSS signal. Furthermore, the first vehicle 300 may receive second location information related to the second vehicle 350 from the second vehicle 350 through the communicator 301. The first vehicle 300 may identify the distance between the first vehicle 300 and the second vehicle 350 based on the first location information and the second location information.

The first vehicle 300 may insert the pad data into the at least one data frame in response to the identified distance within the predetermined distance range (803).

The first vehicle 300 may insert the pad data after a data field of the at least one data frame. For example, the pad data may include dummy data or data for removing a noise component.

The first vehicle 300 may insert the pad data into the at least one data frame according to a method for inserting the dynamic pad data.

For example, the first vehicle 300 may identify the length of the pad data corresponding to the identified distance among predetermined lengths of the pad data corresponding to respective distances between the two vehicles, i.e., the first vehicle 300 and the second vehicle 350. The first vehicle 300 may insert the pad data (also referred to as the dynamic pad data) of the identified length into the at least one data frame.

The first vehicle 300 may insert the pad data into the at least one data frame according to a method for inserting the fixed pad data.

For example, the first vehicle 300 may insert the pad data (also referred to as the fixed pad data) of the predetermined length into the at least one data frame.

The first vehicle 300 may transmit the at least one data frame in which the pad data is inserted to the second vehicle 350 (805).

Meanwhile, in the above-described embodiments, it has been described that the first vehicle 300 identifies the distance between the first vehicle 300 and the second vehicle 350 based on the GNSS signal. However, according to another embodiment, the first vehicle 300 may identify the distance between the first vehicle 300 and the second vehicle 350 through various conventional techniques for identifying the separation distance between the two vehicles. For example, the first vehicle 300 may identify the distance from the second vehicle 350 based on a radar (not shown) and an output signal from a lidar (not shown) and/or a camera (not shown) of the first vehicle 300.

Figure 9:
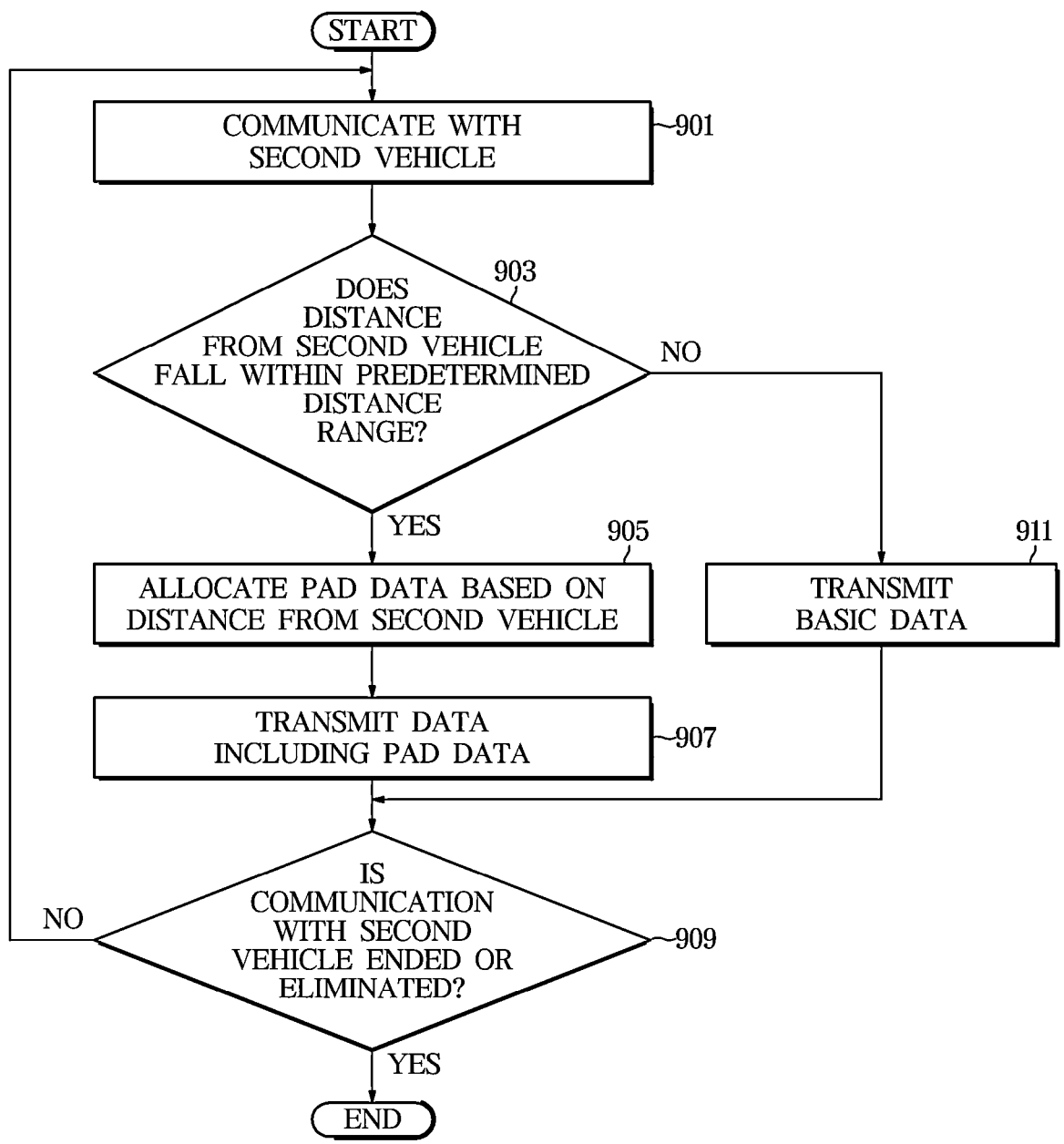
FIG. 9 is a flowchart showing an operation of the first vehicle according to the embodiment.

FIG. 9 is a flowchart showing an operation of the first vehicle 300 (and/or the controller 305 of the first vehicle 300) according to an embodiment.

The first vehicle 300 may communicate with the second vehicle 350 through the communicator 301 (901).

The first vehicle 300 may identify whether the distance from the second vehicle 350 falls within the predetermined distance range (903).

The predetermined distance range may be 80 m to 120 m.

When the distance from the second vehicle 350 falls within the predetermined distance range (YES in 903), operation 905 may be performed; otherwise, operation 911 may be performed (NO in 903).

The first vehicle 300 may allocate the pad data to the data based on the distance from the second vehicle 350 (905).

The length of the pad data for each distance (or distance range) within the distance range may be predetermined and stored in the storage 303 of the first vehicle 300. Therefore, the first vehicle 300 may identify the pad data of a length corresponding to the distance from the second vehicle 350 and allocate the pad data of the length corresponding to the distance from the second vehicle 350 to the data.

For example, the first vehicle 300 may allocate the pad data to each data frame of the data.

The first vehicle 300 may transmit the data including the pad data to the second vehicle 350 through the communicator 301 (907).

The first vehicle 300 may identify whether communication with the second vehicle 350 has been eliminated or ended (909).

When the communication with the second vehicle 350 is eliminated or ended, the operation of the embodiment is eliminated or ended (YES in 909). Otherwise, operation 901 may be performed again (NO in 909).

When the distance from the second vehicle 350 does not fall within the distance range, the first vehicle 300 may transmit basic data to the second device 350 through the communicator 301 (911).

The basic data refers to data having a conventional predetermined basic structure to which the pad data is not allocated.

If the distance between the first vehicle 300 and the second vehicle 350 is not within a reference range, the first vehicle 300 does not allocate the pad data to the data, and thus the throughput rates of the data of the first vehicle 300 and the second vehicle 350 may be effectively managed.

On the other hand, although not shown in drawings, the second vehicle 350 may receive the data including the pad data from the first vehicle 300 and remove noise generated between data frames, i.e., noise caused by the short-distance road surface interference based on a predetermined interference cancellation algorithm.

Figure 10:
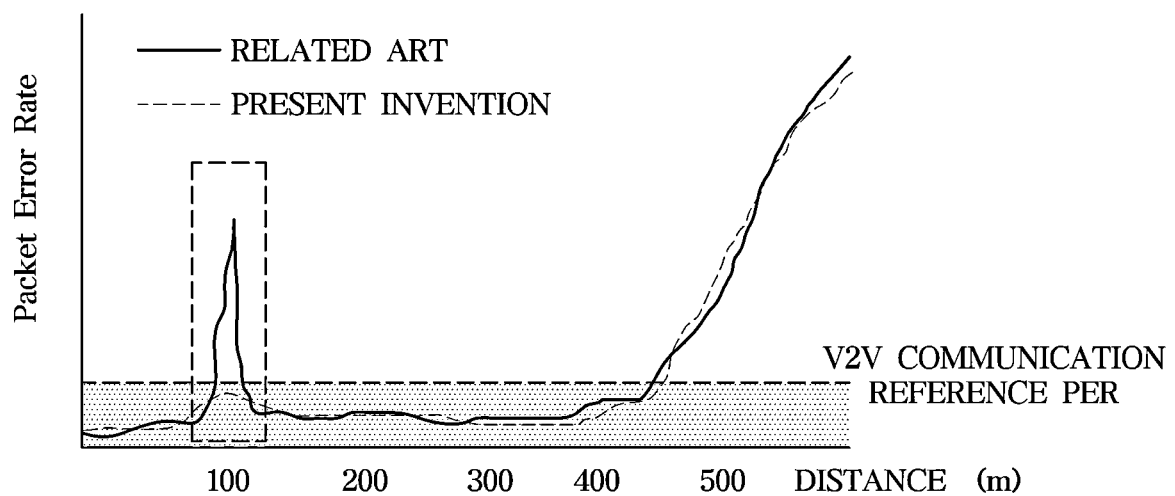
FIG. 10 is a graph showing a result of calculating a PER for each distance between vehicles in communication between vehicles according to the embodiment.

FIG. 10 is a graph showing a result of calculating a PER for each distance between vehicles in communication between vehicles according to an embodiment.

Referring to FIG. 10, in the conventional communication between the first vehicle 100 and the second vehicle 150, when the separation distance between the first vehicle 100 and the second vehicle 150 is about 100 m, the PER rapidly increases due to noise caused by the short-distance road surface interference. On the other hand, in the communication between the first vehicle 300 and the second vehicle 350 according to the embodiment of the present disclosure, when the separation distance between the first vehicle 300 and the second vehicle 350 is about 100 m, the PER is significantly lower than that of the related art.

Therefore, the above-described embodiment may improve communication performance by effectively control data errors that occur during the short-distance communication in the V2V communication system 3.

In general, because a reversed phase signal generated at a short-distance greatly affects an original signal, the PER may be rapidly increased. This is a task that needs to be solved for safe driving of vehicles that provide services such as autonomous driving.

In the above-described embodiment, by inserting the pad data into the data in order to correspond to noise generated in the short-distance communication, a signal coming in reversed phase is blocked. Therefore, the above-described embodiment is a technology that does not affect the original signal with a simple structure. Furthermore, because the above-described embodiment may operate dynamically in response to the distance between vehicles, loss of the data throughput of the vehicles is not large and stable communication between the vehicles may be maintained. In other words, the stable PER performance of the V2V communication system 3 may be secured, so a quality of communication service between the vehicles may be improved.

As is apparent from the above, the embodiments of the present disclosure may overcome a degradation of communication performance due to road reflection of signals in short-distance communication between vehicles, may secure stable performance of the V2V communication of the vehicle on an actual road, and thus may enable high-quality communication between vehicles.

Furthermore, the embodiments of the present disclosure may solve the problem that the reversed phase signal is generated during the short-distance communication in the conventional V2V communication system and greatly affects the original signal, and the PER rapidly increases.

Furthermore, the embodiments of the present disclosure may provide a technology removing multi-path noise generated due to the short-distance road surface reflection by adding the pad data for noise response to the data frame.

On the other hand, the above-described embodiments may be implemented in the form of a recording medium storing commands executable by a computer. The commands may be stored in the form of program code. When the commands are executed by a processor, a program module is generated by the commands so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the present disclosure have been shown and described, it should be appreciated by those having ordinary skill in the art that changes may be made in these embodiments without departing from the principles and spirit of the present disclosure, the scope of which is defined in the claims and their equivalents.

What is claimed is:

1. A vehicle, comprising:
a communicator; and
a controller electrically connected to the communicator,
wherein the controller is configured to
receive a global navigation satellite system (GNSS) signal through the communicator,
identify a distance between a vehicle and the other vehicle communicatively connected to the vehicle based on the GNSS signal,
determine a length of pad data based on the identified distance between the vehicle and the other vehicle, wherein the length of the pad data varies according to the distance between the vehicles,
insert the determined pad data into at least one data frame, and
transmit the at least one data frame into which the pad data is inserted to the other vehicle through the communicator.

2. The vehicle of claim 1, wherein the controller is configured to:
identify a length of the pad data corresponding to the identified distance among predetermined lengths of the pad data corresponding to respective distances between two vehicles; and
insert the pad data having the identified length into the at least one data frame.

3. The vehicle of claim 1, wherein the controller is configured to insert the pad data having a predetermined length into the at least one data frame.

4. The vehicle of claim 1, wherein the controller is configured to insert the pad data to be positioned after a data field of the at least one data frame.

5. The vehicle of claim 1, wherein the pad data includes a predetermined data for removing a noise component.

6. The vehicle of claim 1, wherein the controller is configured to:
identify first location information related to the vehicle based on the GNSS signal;
receive second location information related to the other vehicle from the other vehicle through the communicator; and
identify the distance between the vehicle and the other vehicle based on the first location information and the second location information.

7. The vehicle of claim 1, wherein the controller is configured to insert the pad data into the at least one data frame based on whether the identified distance falls within a predetermined distance range.

8. A method of controlling a vehicle, the method comprising:
receiving, by a controller, a global navigation satellite system (GNSS) signal;
identifying, by a controller, a distance between a vehicle and the other vehicle communicatively connected to the vehicle based on the GNSS signal;
determining, by the controller, a length of pad data based on the identified distance between the vehicle and the other vehicle, wherein the length of the pad data varies according to the distance between the vehicles;
inserting, by the controller, the pad data into at least one data frame; and
transmitting, by the controller, the at least one data frame in which the pad data is inserted to the other vehicle.

9. The method of claim 8, wherein the inserting the pad data comprises:
identifying, by the controller, a length of the pad data corresponding to the identified distance among predetermined lengths of the pad data corresponding to respective distances between two vehicles; and
inserting, by the controller, the pad data having the identified length into the at least one data frame.

10. The method of claim 8, wherein the inserting the pad data comprises:
inserting, by the controller, the pad data having a predetermined length into the at least one data frame.

11. The method of claim 8, wherein the inserting the pad data comprises:
inserting, by the controller, the pad data to be positioned after a data field of the at least one data frame.

12. The method of claim 8, wherein the pad data includes a predetermined data for removing a noise component.

13. The method of claim 8, further comprising:
identifying, by the controller, first location information related to the vehicle based on the GNSS signal; and
receiving, by the controller, second location information related to the other vehicle from the other vehicle,
wherein the distance between the vehicle and the other vehicle, by a controller, is identified based on the first location information and the second location information.

14. The method of claim 8, wherein the inserting the pad data comprises:
performing, by the controller, based on the identified distance within a predetermined distance range.

* * * * *